March 28, 1939.  H. S. CAMPBELL  2,151,687
ROTATIVE WINGED AIRCRAFT
Filed Jan. 8, 1937      3 Sheets-Sheet 1

INVENTOR
Harris S. Campbell
BY
Synnestvedt & Lechner
ATTORNEYS

March 28, 1939. H. S. CAMPBELL 2,151,687
ROTATIVE WINGED AIRCRAFT
Filed Jan. 8, 1937  3 Sheets-Sheet 3

INVENTOR
Harris S. Campbell
BY
Synnestvedt & Lechner
ATTORNEYS

Patented Mar. 28, 1939

2,151,687

UNITED STATES PATENT OFFICE 2,151,687

ROTATIVE WINGED AIRCRAFT

Harris S. Campbell, Willow Grove, Pa., assignor, by mesne assignments, to Autogiro Company of America, a corporation of Delaware Application January 8, 1937, Serial No. 119,575

5 Claims. (Cl. 244—18)

This invention relates to rotative-winged aircraft and is more particularly concerned with a rotor head for such aircraft, including internal and external hub parts and associated mechanisms, all as more fully set out hereinafter.

One of the primary objects of the invention is to simplify the hub structure and the mounting means therefor, considered in general, and further to simplify individual parts of the rotor head assembly, such as the rotative and non-rotative parts of the hub.

In addition, the invention contemplates improvements in driving and braking mechanisms for an aircraft sustaining rotor, especially as to parts of such mechanisms which are immediately associated with the rotor hub.

More specifically, the invention provides for a novel disposition of certain internal parts of the hub such as bearings, so as to permit mounting the hub for controllable tilting within a gimbal ring or the like of unusually small diameter. In conjunction with this phase of the invention, the improved structure also provides a novel arrangement of pivots or trunnions for the gimbal ring and hub, all of which require smaller clearances than prior arrangements and therefore result in further compacting of the entire rotor head assembly.

The clearances referred to above have especial reference to location of certain other parts of the rotor head, such as parts of a driving mechanism adapted for use in initiating rotation of the rotor prior to take-off.

Another object of the invention is related to features of the driving arrangement, according to which the driving torque is transmitted from a driven gear to a hub spindle through an overrunning clutch, the gear and clutch both being located in the plane of a disk which is keyed to the hub spindle. These arrangements reduce irregular bearings and thrust loads and provide for utilization of parts of minimum weight and size.

Referring further to the driving arrangements for the rotor, the invention has in view a novel mounting for the driven gear, in accordance with which this gear is journaled on a non-rotative hub part, substantially independently of the overrunning clutch which is interposed between the gear and the rotative hub part. Thus, in normal flight operation (during which the rotor is not driven) the drag of the driving parts is reduced to a minimum.

Further advantages of the arrangement result from a novel disposition of braking parts for applying a braking torque to the rotor. This arrangement is also of a compact nature and is made readily accessible for adjustment or the like by the employment of a removable casing section incorporated at the bottom of the hub.

How the foregoing objects and advantages are obtained and also others which will occur to those skilled in the art, will be more apparent from a consideration of the following description, referring to the accompanying drawings, in which—

Figure 1:
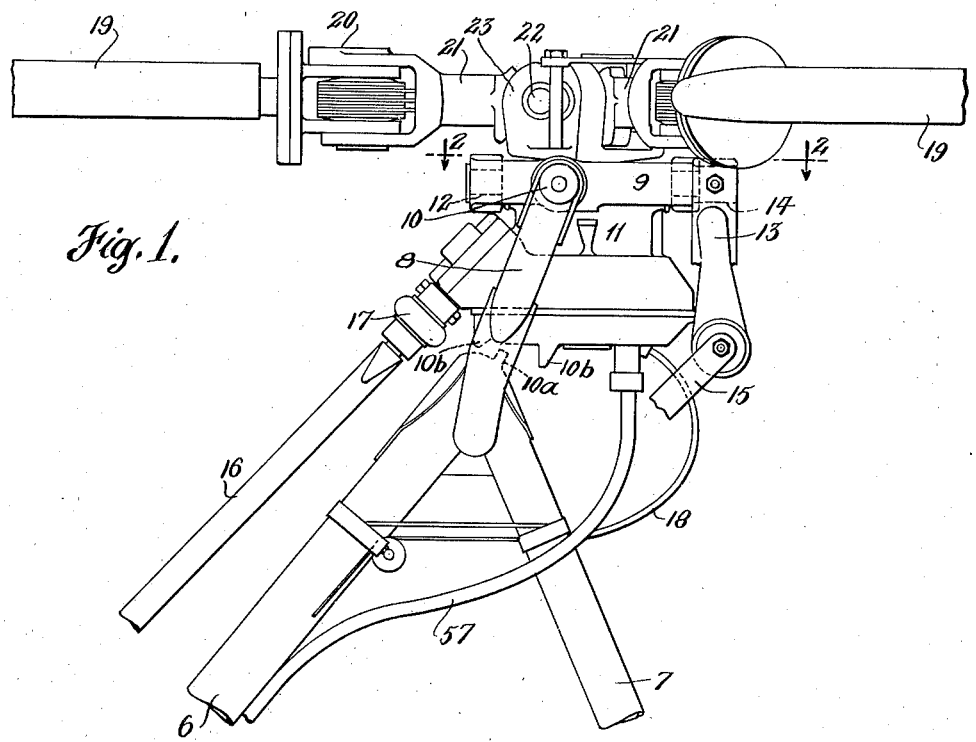
Figure 1 is a side elevational view of a rotor head assembly of the character here involved.
Figure 2:
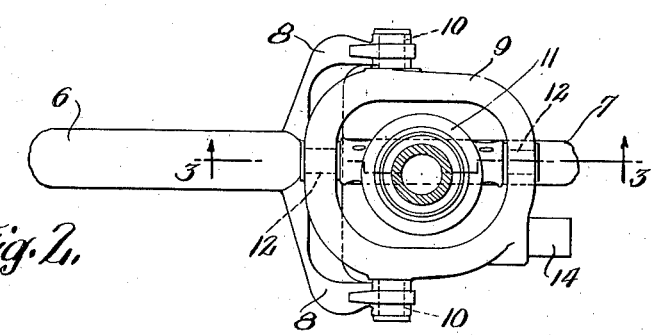
Figure 2 is a horizontal sectional view taken substantially as indicated by the section line 2—2 on Figure 1 but omitting certain parts for the sake of clarity.

In Figure 1 a pair of upwardly converging posts 6 and 7 are shown as constituting the primary support for the rotor of a craft of the type under consideration. These two posts lie substantially in the longitudinal vertical mid-plane of the craft, the post 6 being located in front of the post 7. The two posts are joined at their upper ends and support a pair of laterally and upwardly diverging arms 8—8 (see Figures 1 and 2) forming an upwardly open yoke between which the rotor head is nested. A gimbal ring 9 is pivotally mounted between the upper ends of members 8 by means of trunnions 10—10. The rotor hub indicated generally in Figures 1 and 2 by the reference numeral 11 is received in the gimbal ring and extends thereabove as well as therebelow. The hub is mounted in the ring by means of trunnions 12—12, the two pairs of trunnions thus providing for tilting of the hub in all directions in order to effect flight control of the craft substantially in accordance with the disclosure of the copending application of Juan de la Cierva, Serial No. 645,985, filed December 6, 1932.

Actual tilting of the hub may be effected by suitable control connections including the control arm 13 (see Figure 1) mounted on pin 14 (see Figure 2) and extended downwardly for connection with a control tube or the like 15 (see Figure 1) which may be suitably coupled with a pilot's control in the cockpit of the machine. The control connections 13, 14 and 15 are effective to tilt the rotor fore and aft about the axis of trunnions 10—10. Similar mechanism (not shown) preferably connected with some part of the hub itself may be employed for effecting lateral tilting of the hub.

As clearly seen in Figure 1, stop devices including an intermediate member 10a conveniently located between the forks 8—8 of the mounting yoke, and cooperating spaced abutments 10b—10b serve to limit fore and aft tilting movement of the rotor hub about the axis of the trunnions 10—10.

It will be understood that the craft is ordinarily equipped with an engine and propeller for forward propulsion. The engine may be employed as a source of torque for initiating rotation of the rotor prior to take off from the ground. For this purpose (as seen in Figure 1) a drive shaft 16 is extended upwardly from the body of the craft toward the rotor hub. Toward its upper end the shaft is provided with flexible joints indicated at 17 accommodating the tilting movements of the hub on the control pivots 10—10 and 12—12. Further structure of the drive mechanism will be described hereinafter, especially those parts of the mechanism which are immediately associated with the hub spindle.

In order to slow down rotation of the rotor after making a landing, the rotor hub also incorporates brake mechanism, hereinafter described more in detail, the control for which is indicated at 18 in Figure 1.

Still referring to Figure 1, portions of two of the rotor blades incorporated in the rotor are shown at 19, these blades being coupled by means of a "drag" articulation 20 with an extension link 21 which, in turn, is coupled by means of a "flapping" articulation 22 to pairs of apertured ears 23 at the top of the rotor hub.

Figure 3:
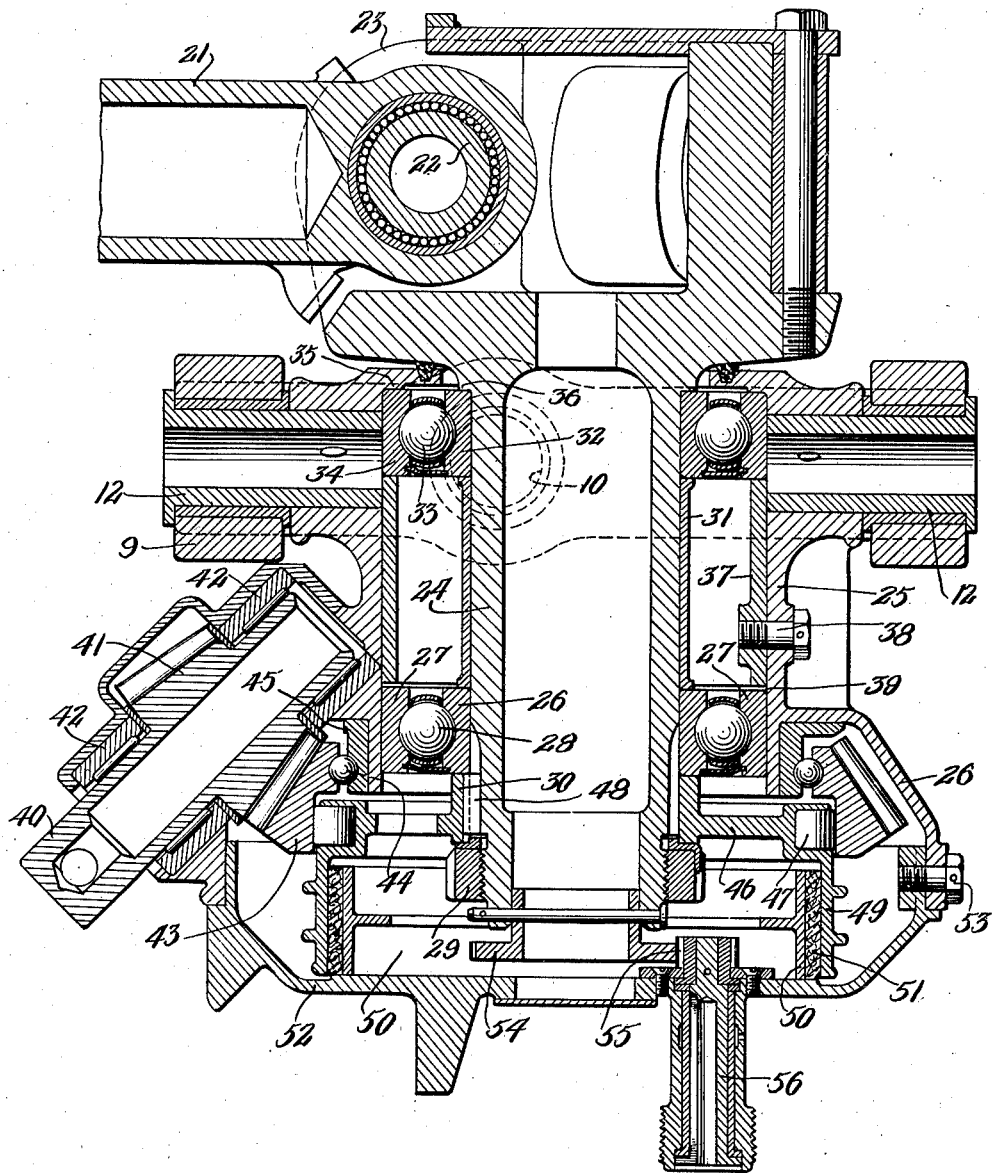
Figure 3 is a vertical sectional view through the rotor hub shown in Figures 1 and 2, this view being taken substantially as indicated by the section line 3—3 on Figure 2.

Referring now particularly to Figure 3, it will be seen that the apertured lugs or ears 23 are formed at the top and as a part of the rotative hub spindle 24. This spindle is journaled in a housing having a relatively narrow neck portion 25 and a lower and larger diameter casing part 26.

As already mentioned, the control pivots or trunnions 12—12 mount the hub casing for tilting movement within the gimbal ring 9. These pivots are clearly shown in Figure 3.

A pair of spaced bearings is interposed between the rotative spindle 24 and the cylindrical cavity in the neck or small diameter part 25 of the housing. The lower one of these bearings includes an inner race 26 and an outer race 27 with rolling elements such as balls 28 therebetween. The thrust of sustentation is transmitted from the lower end of the rotative spindle 24 through the removable nut 29 and sleeve 30 to the inner race 26 of the lower bearing. From this point the thrust is transmitted through the spacing sleeve 31 upwardly to the inner race 32 of the upper bearing, from which it is carried through the balls 33 thereof to the outer race 34 and from thence to the shoulder 35 at the top of the hub housing. An external shoulder 36 is provided adjacent the upper end of the rotative spindle part 24 proper and serves as an abutment or reaction point for the nut 29, which latter thus tightens all of the intermediate members in position.

An additional sleeve 37 fitting the inside diameter of the housing part 25 is provided, this sleeve being fastened in place as by bolts 38 and being of such axial dimension as to leave a small clearance 39 adjacent the outer race 27 of the lower bearing. This arrangement materially simplifies assembly, fitting and the like of the bearing parts and associated spacing sleeves, etc., particularly since it eliminates the necessity for machining of various parts to within close tolerance figures.

A further advantage of this arrangement is that in the event of failure of the upper bearing, the lower bearing will assume the thrust.

Referring now to the drive mechanism, the shaft 16 hereinbefore referred to, is adapted to be coupled (through the flexible joints 17 shown in Figure 1) with the pinion shaft 40 carrying pinion 41. The shaft is provided with bearings 42—42, both of which are mounted in the housing of the hub and which are located one at either side of the plane of rotation of the pinion. The pinion, in turn, meshes with a driven ring gear 43 which has a bearing, composed of rolling elements 44, mounting it on a race 45 carried by the hub part 25 within the casing or housing 26. The gear is adapted to be coupled with the disk 46 by means of an overrunning clutch incorporating rollers 47 riding in arcuate pockets at the periphery of the disk 46. The disk 46, in turn, is formed as a part of the sleeve 30 which, of course, is keyed to the spindle 24 as at 48.

The disk 46 is also provided with a cylindrical part 49 having a braking surface thereon for cooperation with brake shoes 50, suitable friction material 51 being interposed therebetween. The brake shoes are mounted on the casing part 52 generally of dish shape which is secured to the casing part 26 by bolts 53 and which is removable downwardly to permit access not only to the brake parts but also to elements of the drive mechanism.

At the extreme lower end of the spindle 24, a gear 54 is mounted in position to cooperate with a pinion 55 carried on a shaft 56 projecting downwardly through the casing for connection with a flexible shaft mounted in sheath 57 (see Figure 1). This structure is employed to actuate a tachometer giving rotor speed readings.

Figure 4:
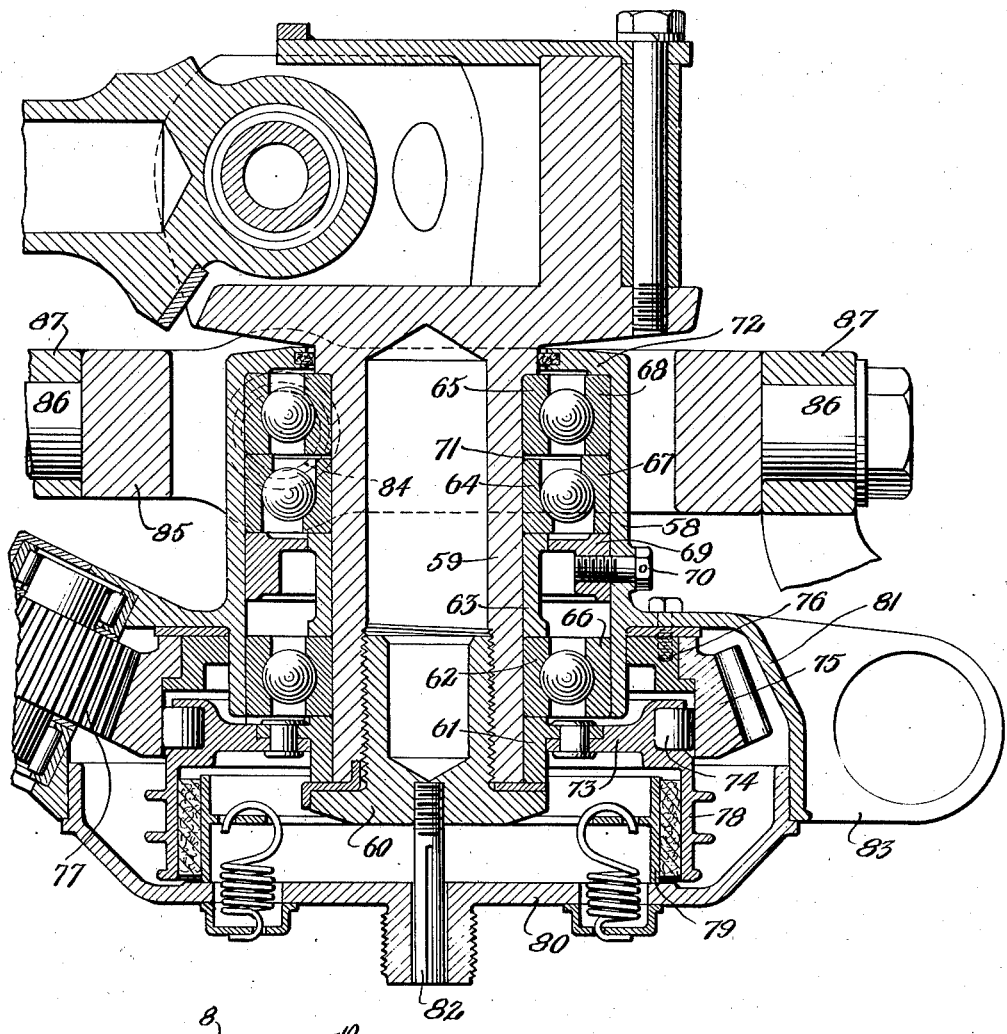
Figure 4 is a vertical sectional view similar to Figure 3 but illustrating a modified construction.

Figure 4 is a view similar to Figure 3 illustrating a modified form of certain features of the rotor hub. In this form the narrow part of the hub housing 58 surrounds a rotative hub spindle 59 having a flanged plug 60 threaded into the lower end thereof so as to position and secure bearing parts interposed between the spindle and housing. These parts are of modified arrangement and include the sleeve 61, a lower radial bearing having an inner race 62, a spacing sleeve 63, a thrust bearing having an inner race 64, the outer race 67 of this bearing and the outer race 68 of an upper radial bearing. The outer races 66, 67 and 68 (bottom to top) fit the inside diameter of the cylindrical part of the hub housing 58. An annular member 69 fastened in place by bolts 70 serves to position the outer races 67 and 68 of the thrust bearing and the upper radial bearing. Clearance is provided between the inner race 65 of the upper radial bearing and the immediate subjacent thrust bearing as at 71, and in view of this arrangement the thrust of sustentation is transmitted from the rotative spindle 59 upwardly through the sleeve 61, the inner race 62 of the lower radial bearing, the spacing sleeve 63, the inner race 64 of the thrust bearing and through this bearing to the outer race thereof, from which the thrust is carried through the outer race 68 of the upper radial bearing to the shouldered part 72 of the housing.

The foregoing bearing arrangement thus provides for the carrying of the thrust load in one bearing, using the remaining bearings for radial loads only during normal flight.

The collar 61 serves to carry the disk or annular member 73 which, similarly to the drive arrangement described in connection with Figure 3, cooperates with the overrunning rollers 74 which are surrounded by the ring gear 75. The supporting bearing for the gear 75 is of modified form, in that it comprises a plain bearing bushing 76 instead of the balls 44 employed in the arrangement of Figure 3. In both cases, however, it will be noted that the ring gear is journaled on the non-rotative housing part substantially independently of the associated overrunning clutch.

As in the arrangement already described, a pinion 77 cooperates with the ring gear to drive the same.

The member 73 in the form of Figure 4 also carries a cylindrical part 78 serving as a brake drum in cooperation with the brake shoes or equivalent braking means 79. Here again, the internal brake parts are mounted for removal with the lower casing part 80 which cooperates with the housing or casing part 81 of the hub to form a complete enclosure for the brake and driving parts.

A connection shaft 82 tapped into the plug 60 at the bottom of the rotative spindle 59 may be employed as a drive take-off for the rotor tachometer.

Toward the right of Figure 4 it will be noted that the hub casing part 81 is equipped with an eye 83 to which a control tube or lever may be attached and extended downwardly into the cockpit of the machine for effecting tilting movements of the hub to control the craft in flight.

The modified form of Figure 4 also incorporates a different arrangement of gimbal ring and tilting pivots. One of two laterally aligned trunnions is shown at 84, these trunnions serving to mount the rotor hub proper within the gimbal ring 85 for tilting movement fore and aft of the craft. The gimbal ring, in turn, is mounted by means of trunnions 86—86 for tilting movement with respect to fixed supporting elements 87—87, and this gimbal ring arrangement is, therefore, inverted with reference to the structure of Figure 3. The form of Figure 4 will be found to be preferable in cases where fixed supporting elements for the hub may most conveniently be brought up to the gimbal ring at points in front of and to the rear of the rotor hub, in contrast with the arrangement previously described (see particularly Figures 1 and 2) wherein the fixed supporting elements are brought up at the sides of the rotor hub.

Figure 5:
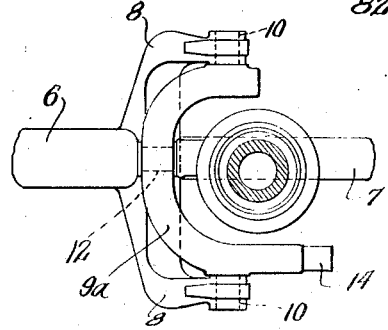
Figure 5 is a view similar to Figure 2 but showing a modification of the gimbal ring mounting for the hub.

A further modification of the mounting is illustrated in Figure 5. Here the arrangement is quite similar to that of Figure 2 although the gimbal ring 9a only partially surrounds the rotor hub, there being a pair of laterally positioned trunnions 10—10 as in Figure 2 but only a single trunnion 12. This single trunnion, however, is located in front of the hub, and is therefore positioned close to the location of the rotor thrust line which in normal flight moves forwardly of the rotor axis line.

The arrangements of Figures 1, 2, 3 and 5 as to the gimbal ring mounting are especially advantageous from the standpoint of simplicity of parts and also because the fore and aft and lateral tilting trunnions are so related to the gimbal ring as to substantially eliminate the necessity for vertical clearance between the top of the portion of the housing surrounding the driving pinion 43 and the underside of the gimbal ring, there being no relative vertical movement between these parts at the point where the drive is brought up to the hub. The arrangements of Figures 1, 2, 3 and 5 is further of especial advantage in providing an overall external shape which is relatively easily faired to a streamlined contour.

In all forms illustrated the gimbal ring arrangement and the various parts including the bearings, etc. of the hub proper are so relatively located that a gimbal ring of relatively small overall diameter may be employed. It will be noted that the hub incorporates an upper fitting for attachment of blades which is of substantial overall diameter and a lower housing for enclosing the driving and braking parts, between which upper fitting and lower housing there is provided a relatively narrow neck. The gimbal ring lies in such a horizontal plane as to surround this narrow neck.

The arrangement of the ring or trunnion gear within the hub of both forms is of particular advantage because of several factors including the simplicity of the parts, the direct transmission of driving thrust through the plane of the supporting disk for the over-running clutch, and the mounting of the trunnion gear on a bearing carried by the housing independently of the overrunning clutch.

Maximum accessibility of the driving and braking parts is also provided for, since the lower casing part of the hub may readily be dropped, thus withdrawing the brake parts and also exposing driving parts.

I claim:

1. For an aircraft having a sustaining rotor, a rotor head assembly including a rotative hub spindle, means for pivotally attaching the blades of the rotor to the upper end of the spindle, a supporting housing surrounding a lower portion of the spindle, a pair of bearings between the spindle and housing spaced axially thereof, a driven gear secured to the spindle below the lower of said bearings, a cooperating driving gear journaled in the housing adjacent the driven gear, an overrunning clutch between the driven gear and the spindle, and a bearing mounting the driven gear on the housing and serving to transmit bearing loads to the housing substantially independently of the overrunning clutch.

2. In a hub structure for an aircraft sustaining rotor, cooperating rotative and non-rotative hub parts the latter of which serves as a bearing support for the former, a driven gear for the rotative part, an overrunning clutch between said gear and said part, and a bearing mounting said gear on the nonrotative part.

3. In a hub structure for an aircraft sustaining rotor, cooperating rotative and non-rotative hub parts the latter of which serves as a bearing support for the former, a brake drum including disk and cylindrical portions secured to the rotative part of the hub, means cooperating with the cylindrical portion of the drum for applying a braking torque to the rotative part, driving means for the rotative part including a driven gear and an overrunning clutch interposed between the gear and the disk portion of said drum substantially in the plane thereof, and a bearing for mounting said gear on the nonrotative part of the hub.

4. In an aircraft sustaining rotor hub structure, an internal rotative hub spindle, a surrounding supporting housing, a pair of axially spaced bearings between the spindle and housing, each of said bearings including inner and outer races with rolling elements therebetween, means for transmitting the thrust of sustension from said spindle to the inner race of the lower bearing, means for transmitting said thrust from the inner race of the lower bearing to the inner race of the upper bearing, and means for transmitting said thrust from the outer race of the upper bearing to the housing, the outer race of the lower bearing being axially positioned only by its cooperation with the associated rolling elements.

5. In a rotor hub having an internal rotative hub spindle and a surrounding supporting housing, a bearing between the housing and spindle, and driving means for the spindle including a driven gear, an overrunning clutch operatively interposed between the spindle and the gear immediately adjacent the plane of said bearing, and a bearing mounting said gear on the housing in the plane of said bearing.

HARRIS S. CAMPBELL.